(12) United States Patent
Emizu et al.

(10) Patent No.: US 8,137,224 B2
(45) Date of Patent: Mar. 20, 2012

(54) TENSIONER FOR ENDLESS TRANSMISSION BELT AND INTERNAL COMBUSTION ENGINE HAVING THE TENSIONER

(75) Inventors: Osamu Emizu, Wako (JP); Hiroshi Yamaura, Wako (JP); Ryuta Niimura, Wako (JP); Yasuhiro Fukuyoshi, Wako (JP); Takao Kudo, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 528 days.

(21) Appl. No.: 12/359,981

(22) Filed: Jan. 26, 2009

(65) Prior Publication Data

US 2009/0197722 A1 Aug. 6, 2009

(30) Foreign Application Priority Data

Jan. 31, 2008 (JP) .................................. 2008-022047

(51) Int. Cl.
*F16H 7/08* (2006.01)
(52) U.S. Cl. ...................................................... 474/110
(58) Field of Classification Search .............. 474/5, 91, 474/100–115, 117, 138
See application file for complete search history.

(56) References Cited

U.S. PATENT DOCUMENTS

| | | | | |
|---|---|---|---|---|
| 4,507,103 A | * | 3/1985 | Mittermeier | 474/110 |
| 5,304,099 A | * | 4/1994 | Deppe et al. | 474/110 |
| 6,196,939 B1 | * | 3/2001 | Simpson | 474/110 |
| 6,383,103 B1 | * | 5/2002 | Fujimoto et al. | 474/110 |
| 6,609,987 B1 | * | 8/2003 | Beardmore | 474/111 |
| 6,729,986 B2 | * | 5/2004 | Kurohata et al. | 474/110 |
| 7,070,528 B2 | * | 7/2006 | Emizu et al. | 474/110 |
| 7,699,730 B2 | * | 4/2010 | Emizu et al. | 474/110 |
| 2001/0006917 A1 | * | 7/2001 | Hashimoto | 474/110 |
| 2009/0017949 A1 | * | 1/2009 | Sato et al. | 474/111 |
| 2009/0197722 A1 | * | 8/2009 | Emizu et al. | 474/110 |
| 2010/0093474 A1 | * | 4/2010 | Onimaru et al. | 474/110 |
| 2010/0173735 A1 | * | 7/2010 | Suchecki | 474/110 |

FOREIGN PATENT DOCUMENTS

JP 2006-144999 6/2006

* cited by examiner

*Primary Examiner* — Michael Mansen
*Assistant Examiner* — Mark K Buse
(74) *Attorney, Agent, or Firm* — Ditthavong Mori & Steiner, P.C.

(57) ABSTRACT

A tensioner for an endless transmission belt includes a plunger body. A plunger is movably provided in a hole of the plunger body to press the belt. A chamber is provided between the plunger and the plunger body to store hydraulic oil. An oil supply passage is provided in the plunger body to supply the oil from an oil pump to the chamber. A check valve is provided between the chamber and the passage and configured to allow the oil to be supplied from the pump to the chamber while the check valve is configured to be closed when a pressure in the chamber is higher than a pressure of the oil supplied by the pump. A relief valve is provided between the chamber and the passage and configured to discharge the oil in the chamber to the passage when the pressure in the chamber exceeds a first predetermined value.

12 Claims, 9 Drawing Sheets

TENSIONER FOR ENDLESS TRANSMISSION BELT AND INTERNAL COMBUSTION ENGINE HAVING THE TENSIONER

CROSS-REFERENCE TO RELATED APPLICATIONS

The present application claims priority under 35 U.S.C. §119 to Japanese Patent Application No. 2008-022047, filed Jan. 31, 2008. The contents of this application are incorporated herein by reference in their entirety.

BACKGROUND OF THE INVENTION

1. Field of the Invention

The present invention relates to a tensioner for an endless transmission belt and an internal combustion engine including the tensioner.

2. Discussion of the Background

A hydraulic tensioner is a tension-maintaining mechanism having a basic principle of pressing a plunger to an endless transmission belt by means of a spring and the hydraulic pressure. Various hydraulic tensioners of different structures have been proposed thus far. See, for example, Japanese Patent Application Publication No. 2006-144999. The contents of Japanese Patent Application Publication No. 2006-144999 are incorporated herein by reference in their entirety.

In FIG. 2 of Japanese Patent Application Publication No. 2006-144999, a hydraulic tensioner (28) (Note that the reference numeral in parentheses is one used in the Japanese Patent Application Publication. The same notation is employed in the following description.) includes a plunger body (32), a plunger (31) which is movably installed in a circular hole (34) formed in the plunger body (32), a compression coil spring (50) that biases the plunger (31), a plunger-side hydraulic chamber (45) that stores hydraulic oil used for pushing out the plunger (31). The hydraulic tensioner (28) is a mechanism for giving a tensile force to a timing chain (4) by pushing out the plunger (31) by means of both the act of the spring and the act of the hydraulic pressure.

A through hole (35) that has an opening in a chain chamber (24) is formed in the head portion of the plunger (31), and a ball check valve (36) that closes the through hole (35) is also provided in the head portion. The ball check valve (36) includes a ball (37) and a compression coil spring (38). When the plunger (31) is excessively pushed leftward in the figure, the internal pressure of the plunger-side hydraulic chamber (45) increases beyond a predetermined pressure and, therefore the ball (37) is moved rightward in the figure against the force applied by the compression coil spring (38). Then, the hydraulic oil in the plunger-side hydraulic chamber (45) is discharged via the through hole (35) to the chain chamber (24), so that the internal pressure of the plunger-side hydraulic chamber (45) is decreased. With the decrease in the internal pressure, the ball (37) moves leftward in the figure, so as to stop the discharging of the hydraulic oil.

As has been described thus far, the ball check valve (36) is a valve which prevents the excessive increase in the internal pressure of the plunger-side hydraulic chamber (45) by discharging the hydraulic oil, and the valve of this type is called a pressure relief valve, in short, a relief valve. So, hereafter, the ball check valve (36) is referred to as the relief valve (36).

Now, suppose a case where the internal pressure of the plunger-side hydraulic chamber (45) exceeds the predetermined pressure, and the hydraulic oil in the plunger-side hydraulic chamber (45) is discharged to the chain chamber (24). In this case, the hydraulic oil in the plunger-side hydraulic chamber (45) decreases by the amount of the discharged hydraulic oil so that the pressure is decreased. Accordingly, it is necessary to supply the hydraulic oil to the plunger-side hydraulic chamber (45) by an oil pump via an oil passage hole 62. The recovering of the level of pressure calls for a quick supply of the hydraulic oil. To meet the needs of such a quick supply, an oil pump of higher capacity is required. As a consequence, the oil pump to be employed for the purpose has to be larger in size.

Meanwhile, the stopping of the engine may cause a phenomenon of a reverse rotation that the crankshaft slightly rotates in a reverse direction immediately before the crankshaft stops. The reverse rotation of the crankshaft tightens the side of the timing chain (4) that has been loose thus far. The tightening strongly pushes back the plunger (31), opens the relief valve (36), and makes the hydraulic oil in the plunger-side hydraulic chamber (45) flow out to the chain chamber (24). At this time, the crankshaft is not moving, and thus the oil pump is not in operation. Consequently, the plunger-side hydraulic chamber (45) is not to be refilled with the hydraulic oil. As a consequence, the timing chain (4) is kept in a state that is opposite to the ordinary state. To put it differently, the side of the timing chain (4) that has been tight thus far is maintained in a loose state. The loose side of the timing chain (4) may produce a noise when the engine starts next time.

SUMMARY OF THE INVENTION

According to one aspect of the present invention, a tensioner for an endless transmission belt includes a plunger body, a plunger, a plunger spring, a high-hydraulic-pressure chamber, an oil supply passage, a check valve, and a relief valve. In the plunger body an installation hole is provided. The plunger is movably provided in the installation hole to press the endless transmission belt. The plunger spring is disposed between the plunger and the plunger body to push the plunger toward the endless transmission belt. The high-hydraulic-pressure chamber is provided between the plunger and the plunger body and configured to store hydraulic oil supplied from an oil pump. The oil supply passage is provided in the plunger body to supply the hydraulic oil from the oil pump to the high-hydraulic-pressure chamber. The check valve is provided between the high-hydraulic-pressure chamber and the oil supply passage and configured to allow the hydraulic oil to be supplied from the oil pump to the high-hydraulic-pressure chamber while the check valve is configured to be closed when a pressure in the high-hydraulic-pressure chamber is higher than a pressure of the hydraulic oil supplied by the oil pump. The relief valve is provided between the high-hydraulic-pressure chamber and the oil supply passage and configured to discharge the hydraulic oil in the high-hydraulic-pressure chamber to the oil supply passage when the pressure in the high-hydraulic-pressure chamber exceeds a first predetermined value.

According to another aspect of the present invention, an internal combustion engine includes an endless transmission belt and a tensioner. The tensioner is configured to press the endless transmission belt. The tensioner includes a plunger body, a plunger, a plunger spring, a high-hydraulic-pressure chamber, an oil supply passage, a check valve, and a relief valve. In the plunger body an installation hole is provided. The plunger is movably provided in the installation hole to press the endless transmission belt. The plunger spring is disposed between the plunger and the plunger body to push the plunger toward the endless transmission belt. The high-hydraulic-pressure chamber is provided between the plunger and the plunger body and configured to store hydraulic oil supplied from an oil pump. The oil supply passage is provided in the plunger body to supply the hydraulic oil from the oil pump to the high-hydraulic-pressure chamber. The check valve is provided between the high-hydraulic-pressure chamber and the oil supply passage. The check valve is configured to allow the hydraulic oil to be supplied from the oil pump to the high-hydraulic-pressure chamber while the check valve is configured to be closed when a pressure in the high-hydraulic-pressure chamber is higher than a pressure of the hydraulic oil supplied by the oil pump. The relief valve is provided between the high-hydraulic-pressure chamber and the oil supply passage. The relief valve is configured to discharge the hydraulic oil in the high-hydraulic-pressure chamber to the oil supply passage when the pressure in the high-hydraulic-pressure chamber exceeds a first predetermined value.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE EMBODIMENT

Embodiments will now be described with reference to the accompanying drawings, wherein like reference numerals designate corresponding or identical elements throughout the various drawings.

Figure 1:
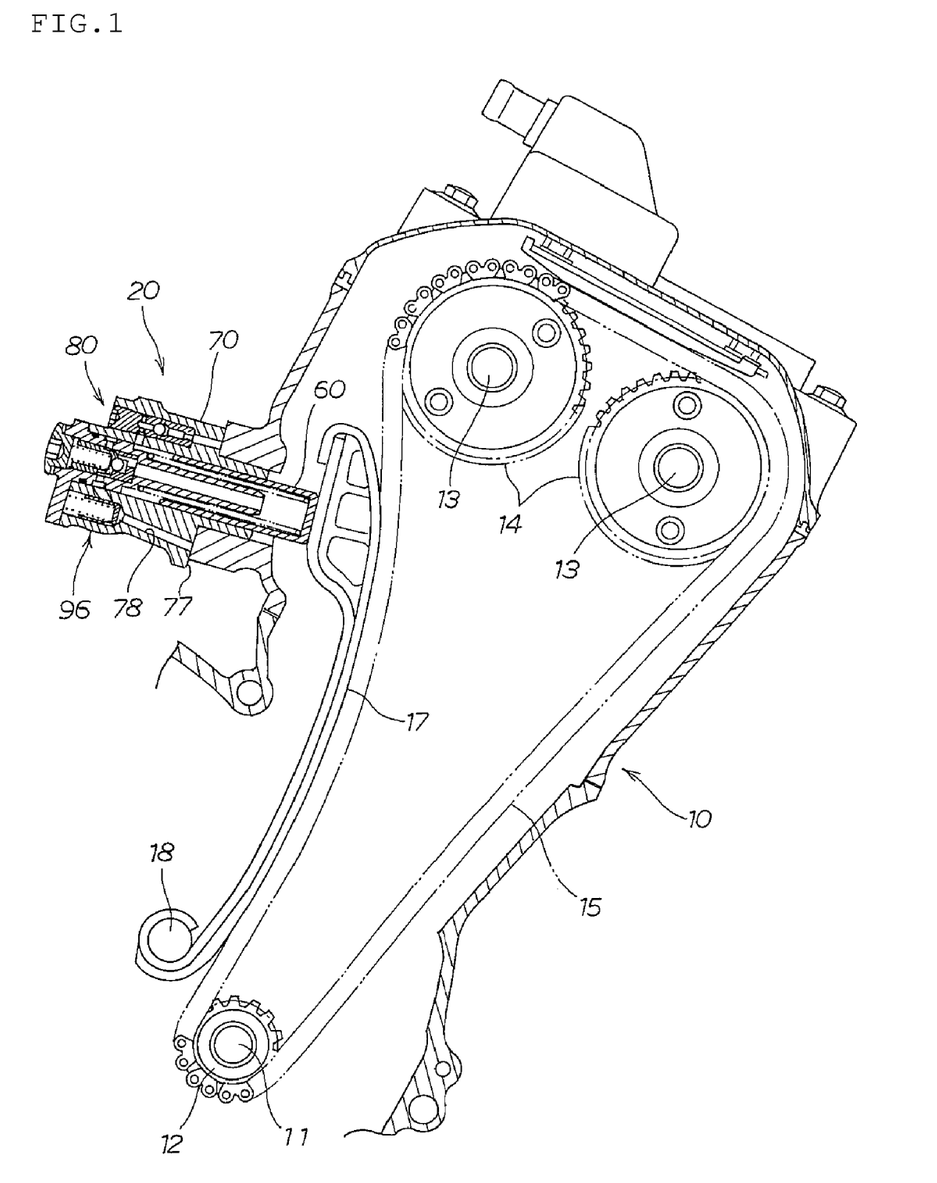
FIG. 1 is a front view of an internal combustion engine equipped with a tensioner for an endless transmission belt according to an embodiment of the present invention.

FIG. 1 is a front elevation view of an internal combustion engine equipped with a tensioner for an endless transmission belt according to an embodiment of the present invention. In an internal combustion engine 10, a drive sprocket 12 is provided on a crankshaft 11, each of driven sprocket 14 and 14 is provided on the corresponding one of a pair of cam shafts 13 and 13, and a cam chain 15 which is an endless transmission belt is looped around the three sprockets 12, and 14 and 14.

Now, suppose a case where the drive sprocket 12 rotates clockwise in the drawing. In this case, one of the sides of the cam chain 15 that is located on the right-hand side thereof becomes tight, and the driven sprockets 14 and 14 are made to rotate accordingly. The left-hand side, in the drawing, of the cam chain 15 becomes loose. Giving a tensile force to the loose side of the cam chain 15 to tighten this side can reduce the unsteady movement of the cam chain 15 at the time of starting the engine 10, at the time of acceleration, at the time of deceleration, and at the time of the reverse rotation.

Accordingly, the internal combustion engine 10 of this embodiment employs the following structure to give a tensile force to the cam chain 15. A tensioner shoe 17 is disposed on the loose side. The bottom end of the tensioner shoe 17 is made to serve as a pivot point 18 for swinging motion, and the upper side of the tensioner shoe 17 is pressed with a tensioner 20 for an endless transmission belt.

The structure of the tensioner 20 for an endless transmission belt will be described below in detail. The description starts with a description of the shape of each constituent element on the basis of various exploded views, and the description of the assembled state will be given after that.

Figure 2:
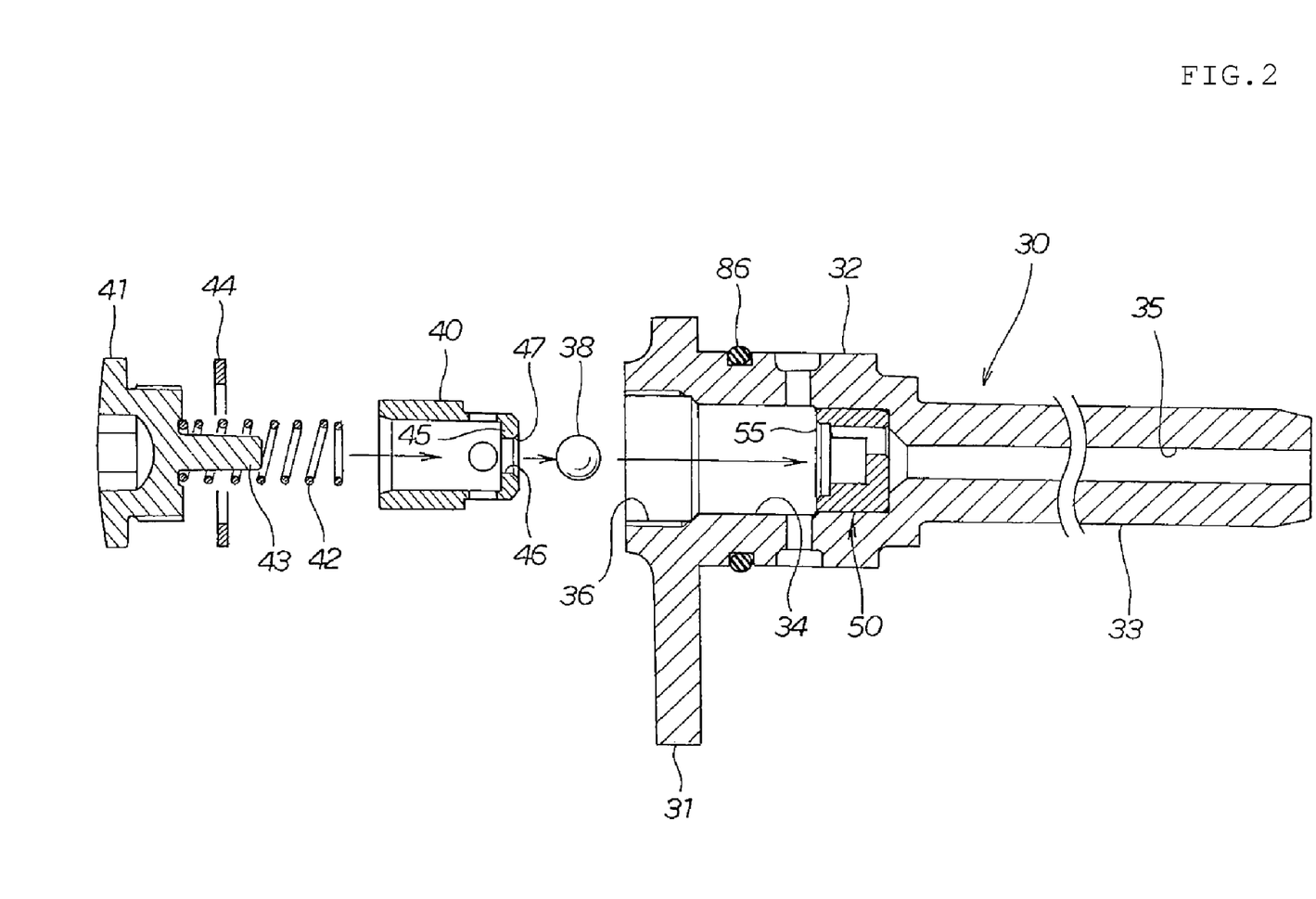
FIG. 2 is an exploded view of a segment body, a relief valve, and a check valve according to the embodiment of the present invention.

FIG. 2 is an exploded view of a segment body, a relief valve, and a check valve. The name "segment body" is employed because the component part referred to by this name is a part formed by dividing a plunger body, which will be described later.

The segment body 30 includes: a columnar portion 32 that includes a flange portion 31; a protruding portion 33 which has a smaller diameter than the columnar portion 32 and which extends from the columnar portion 32; a housing recessed portion 34 that is formed in the center of the columnar portion 32; a through hole 35 that is formed in the center of the protruding portion 33 so as to be contiguous from the housing recessed portion 34; and a female threaded portion 36 that is formed on the opening side of the housing recessed portion 34.

A valve guide 50 to guide a ball-shaped second valve body 38 is pressed to fit into the housing recessed portion 34. The second valve body 38 is inserted into the valve guide 50 (detailed description of these will be given later). A first valve body 40 of a shape of a tube with a bottom is inserted into the housing recessed portion 34 so as to keep the second valve body 38 in place. A lid member 41 is screwed into the female threaded portion 36, and keeps the first valve body 40 in place with a first spring 42 disposed in between. A pillar-shaped spring guide 43 protrudes out from the lid member 41. The spring guide 43 prevents the first spring 42 from moving out of place during the assembling work of the first spring 42. A reference numeral 44 denotes a ring-shaped shim that will be described later.

A through hole 46 is formed in a bottom 45 of the first valve body 40. The outer edge of the through hole 46 is chamfered to form a second valve seat portion 47. The ball-shaped second valve body 38 is brought into contact with this second valve seat portion 47.

Figure 3A:
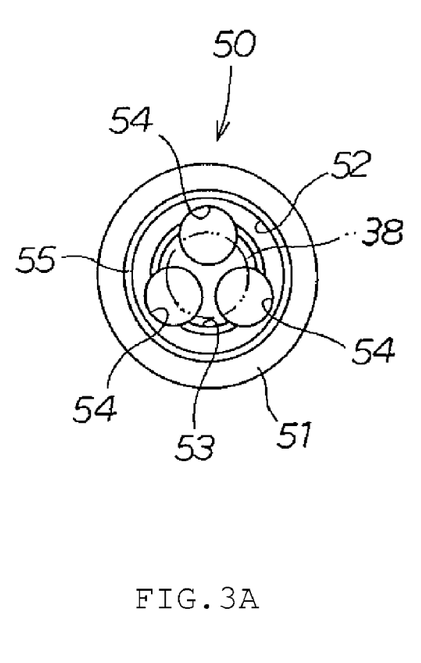
FIGS. 3A-3C are diagrams provided to describe the structure of a valve guide.
Figure 3B:
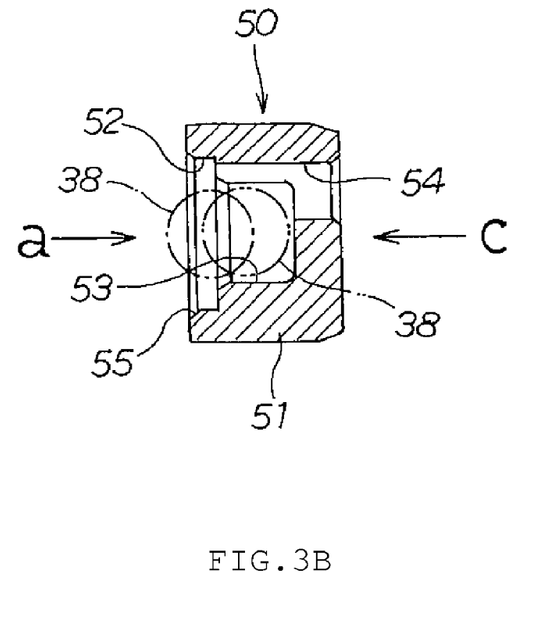
Figure 3C:
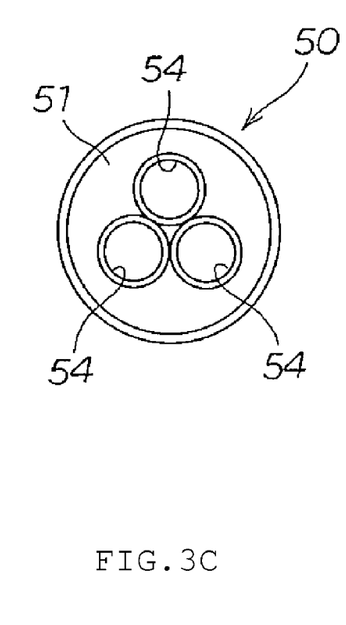

FIGS. 3A-3C show the structure of the valve guide 50. FIG. 3B is a cross-sectional view, FIG. 3A is a view seen as indicated by the arrow a of FIG. 3B, and FIG. 3C is a view seen as indicated by the arrow c of FIG. 3B.

As FIG. 3A shows, the valve guide 50 includes a columnar body 51. The valve guide 50 also includes a large-diameter recessed portion 52 formed in the columnar body 51. In addition, the valve guide 50 includes a guide recessed portion 53 and plural (specifically, three in this embodiment) holes 54. The recessed portion 53 is formed in a portion that is deeper than the large-diameter recessed portion 52. The diameter of the guide recessed portion 53 is slightly larger than the second valve body 38, which is indicated by an imaginary line in the drawings. The holes 54 are formed so as to touch internally the large-diameter recessed portion 52.

As FIG. 3B shows, the second valve body 38 is guided so as to be capable of moving inside the guide recessed portion 53 as indicated by an imaginary line. The open end of the large-diameter recessed portion 52 is chamfered to form a first valve seat portion 55.

As FIG. 3C shows, the three holes 54 are formed in the columnar body 51.

As FIG. 3A shows, even though the second valve body 38 indicated by the imaginary line closes approximately half of the opening area of the holes 54, the rest of the openings is left unclosed. That is, there is no possibility of completely closing the holes 54 because the second valve body 38 moves inside the guide recessed portion 53 in front and back directions of the drawing.

Figure 4:
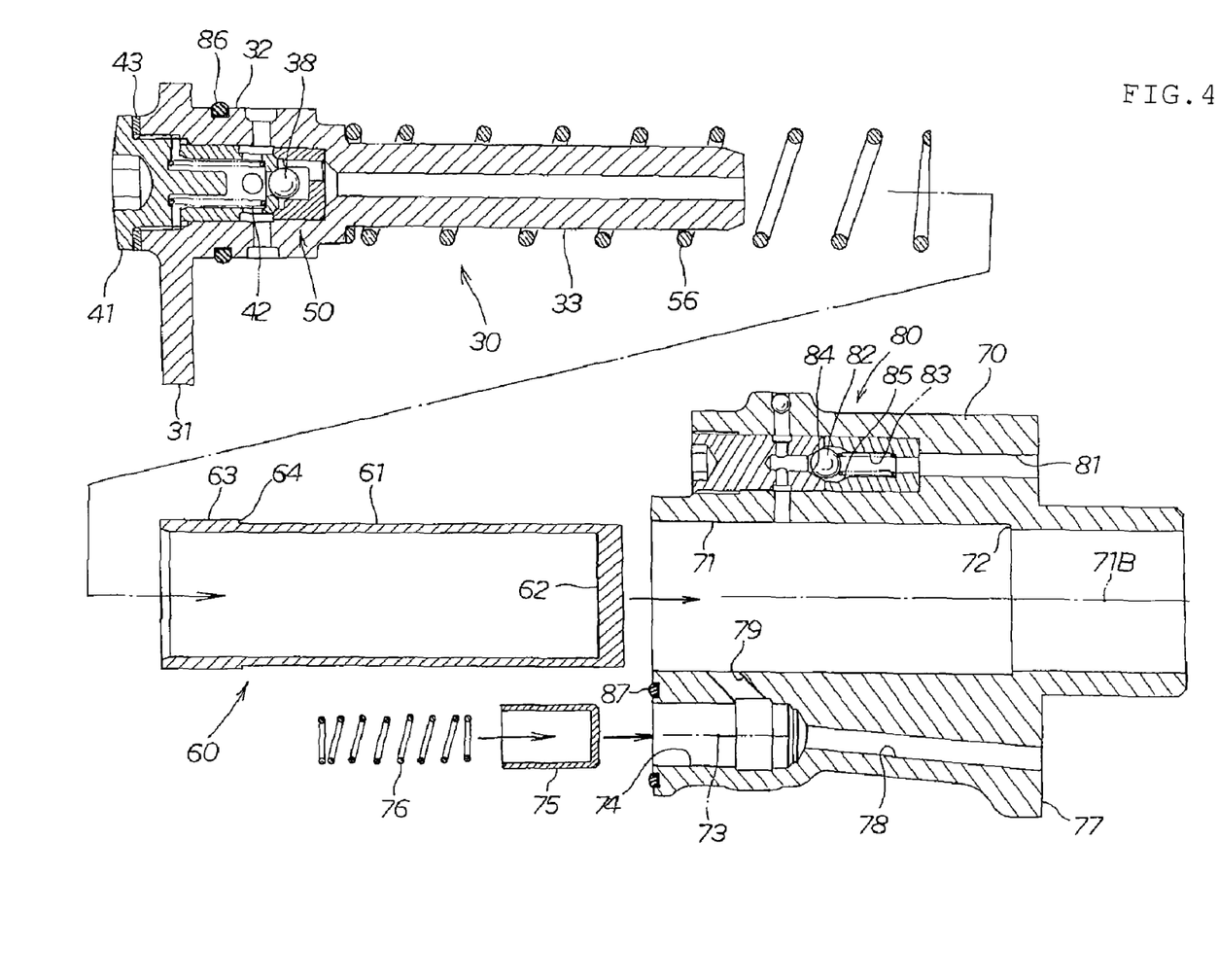
FIG. 4 is an exploded view of a plunger, a plunger body and a pressure retaining valve.

FIG. 4 is an exploded view of a plunger, a plunger body and a pressure retaining valve. A plunger 60 is a tubular body with a bottom, and includes a tubular portion 61 and a bottom portion 62 that closes an end (head end) of the tubular portion 61. The base portion of the plunger 60 has a slightly large diameter, and an end of this large-diameter portion 63 (right-hand side in the drawing) is formed to be a shoulder portion 64. As the figure shows, the plunger 60 is a member that has a simple shape, and the wall of tubular portion 61 is thin. Accordingly, the plunger 60 can be made lighter in weight.

A plunger body 70 is shown on the right-hand side of figure. An installation hole 71 is formed in the center of the plunger body 70 so as to penetrate the plunger body 70. The inner diameter of the installation hole 71 is designed to be equal to the outer diameter of the large-diameter portion 63 of the plunger 60. A stopper portion 72 is formed in the course of the installation hole 71, and the portion of the installation hole 71 beyond this stopper portion 72 (on the right-hand side of the figure) has a slightly smaller diameter than the diameter of the other part of the installation hole 71.

In addition, a retaining-valve installation chamber 74 is formed in substantially parallel to the installation hole 71. A retaining-valve body 75 that has a shape with a bottom and a retaining spring 76 are disposed in this retaining-valve installation chamber 74.

A seat face 77 that abuts on the engine 10 is formed in the plunger body 70. An oil supply passage 78 is formed so as to extend from this seat face 77 and to reach the retaining-valve installation chamber 74. A first communication passage 79 is formed to communicatively connect the retaining-valve installation chamber 74 to the installation hole 71.

Reference numeral 73 denotes a longitudinal axis of the retaining-valve installation chamber 74, (also a longitudinal axis of the pressure retaining valve 96, which will be described later), and the longitudinal axis 73 is substantially parallel to the longitudinal axis 71B of the installation hole 71.

In addition, an air purge valve 80 is formed in the plunger body 70 in substantially parallel to the installation hole 71. An L-shaped purge channel 81 is formed so as to extend from the installation hole 71 and to reach the seat face 77. The air purge valve 80 is provided in the course of this L-shaped purge channel 81. The air purge valve 80 includes: a ball-shaped purge-valve body 82; a purge spring 83 that biases the purge-valve body 82 to a side so as to make the purge-valve body 82 move away from the seat face 77; a first purge-valve seat 84 that receives the purge-valve body 82 when the purge-valve body 82 is pressed by the purge spring 83; and a second purge-valve seat 85 that is formed at the opposite side of the purge-valve body 82 to the first purge-valve seat 84. The operation of the air purge valve 80 will be described later.

From the left-hand side of such an exploded view of the figure, the plunger 60 is inserted into the installation hole 71. The plunger 60 can be inserted to the maximum extent until the shoulder portion 64 abuts on the stopper portion 72. Then, the segment body 30 and a plunger spring 56 are assembled to the plunger body 70 in such a way as to insert the protruding portion 33 into the plunger 60. The configuration of this assembled body will be described with reference to the following figures.

Figure 5:
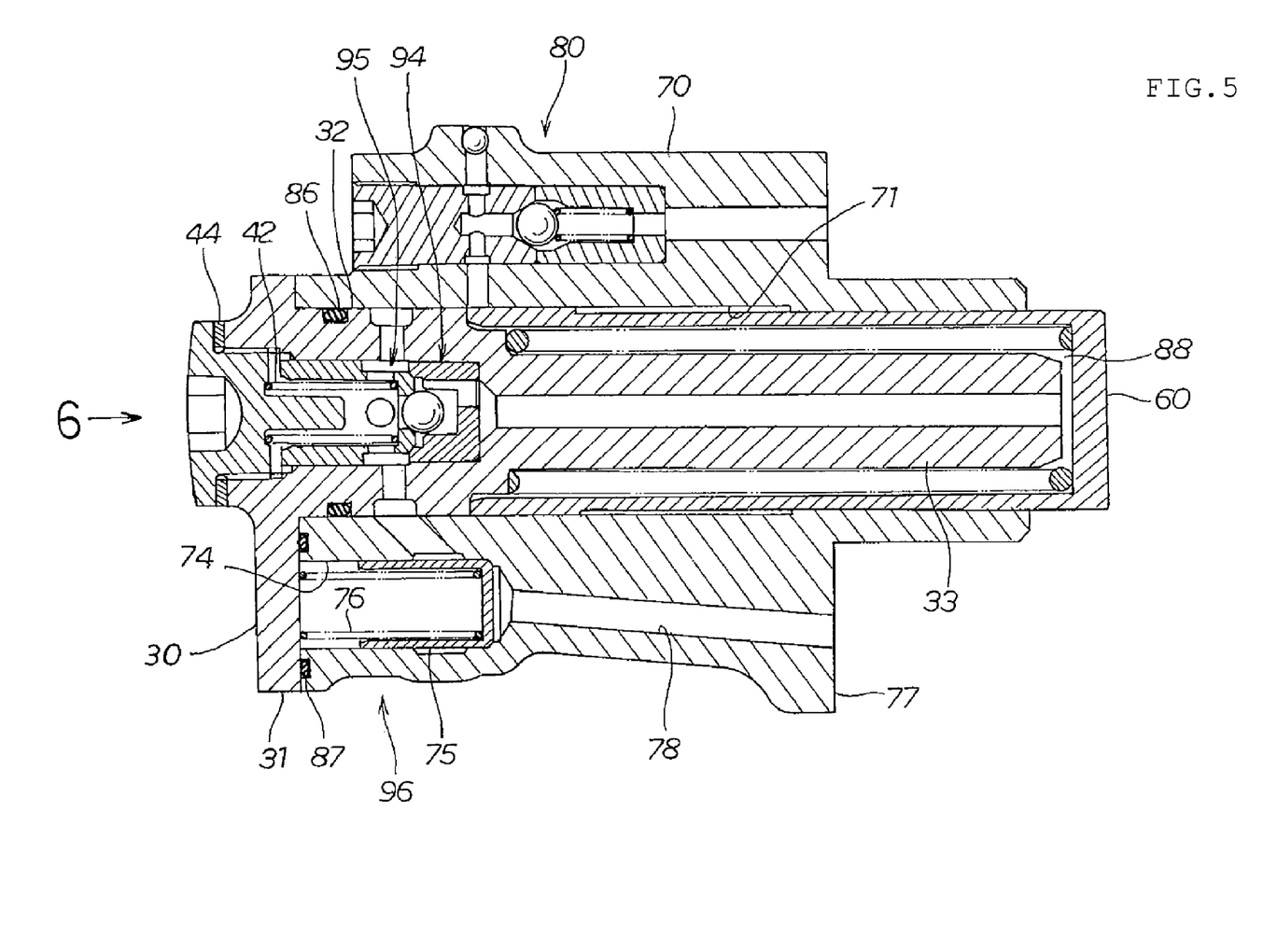
FIG. 5 is a cross-sectional view of the tensioner for an endless transmission belt according to the embodiment of the present invention.

FIG. 5 is a sectional view of the tensioner 20 for an endless transmission belt according to this embodiment of the present invention. The plunger 60 is installed in the installation hole 71 of the plunger body 70, and the segment body 30 is attached to the plunger 60 thus installed. Disposing an O-ring 86 between the installation hole 71 and the columnar portion 32 ensures the sealing therebetween. In addition, a seal material 87 is compressed by the flange portion 31, so that fluid in the retaining-valve installation chamber 74 is prevented from leaking out. Moreover, the setting of the first spring 42 and the setting of the stroke of a relief valve can be altered by changing the height of the shim 44.

In addition, the inside of the plunger 60 is a high-hydraulic-pressure chamber 88 in which the hydraulic oil is stored. The capacity of the high-hydraulic-pressure chamber 88 can be reduced by inserting the protruding portion 33 more deeply into the plunger 60.

Figure 6:
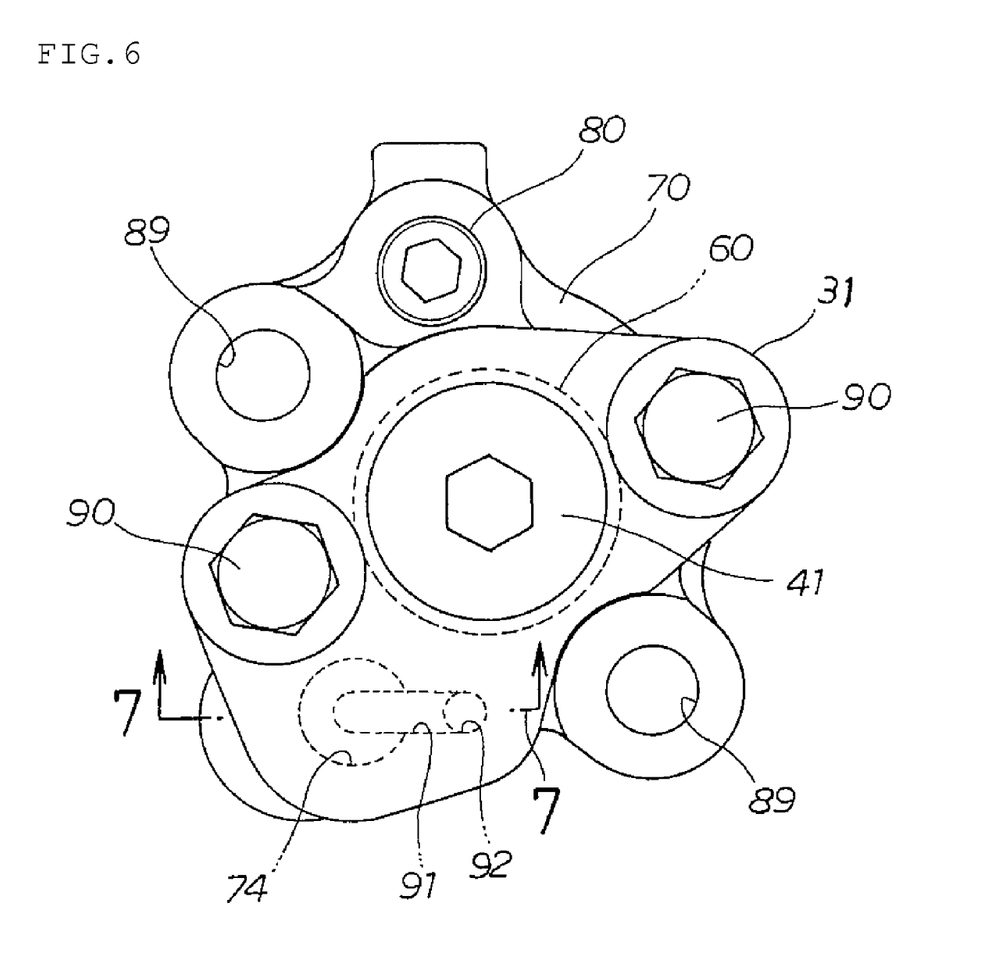
FIG. 6 is a view seen as indicated by the arrow 6 of FIG. 5.

FIG. 6 is a view seen as indicated by an arrow 6 of FIG. 5. A pair of attachments 89 and 89 are formed in the plunger body 70, which is located on the deeper side of the drawing. The attachments 89 and 89 are used when the plunger body 70 is fixed to the internal combustion engine 10. For example, the attachments 89 and 89 are bolt holes. The attachment 89 and 89 are formed at positions where the attachments 89 and 89 can avoid any interference with the air purge valve 80 located at a high position and with the retaining-valve installation chamber 74 located at a low position.

The flange portion 31, which extends obliquely in the figure, is fixed to the plunger body 70 by means of two bolts 90 and 90.

The air purge valve 80, the retaining-valve installation chamber 74, the attachments 89 and 89, and the bolts 90 and 90 are placed so as to surround the plunger 60, which is indicated by the dashed line. Such a placement allows the plunger body 70 to have a smaller outer diameter.

Figure 7:
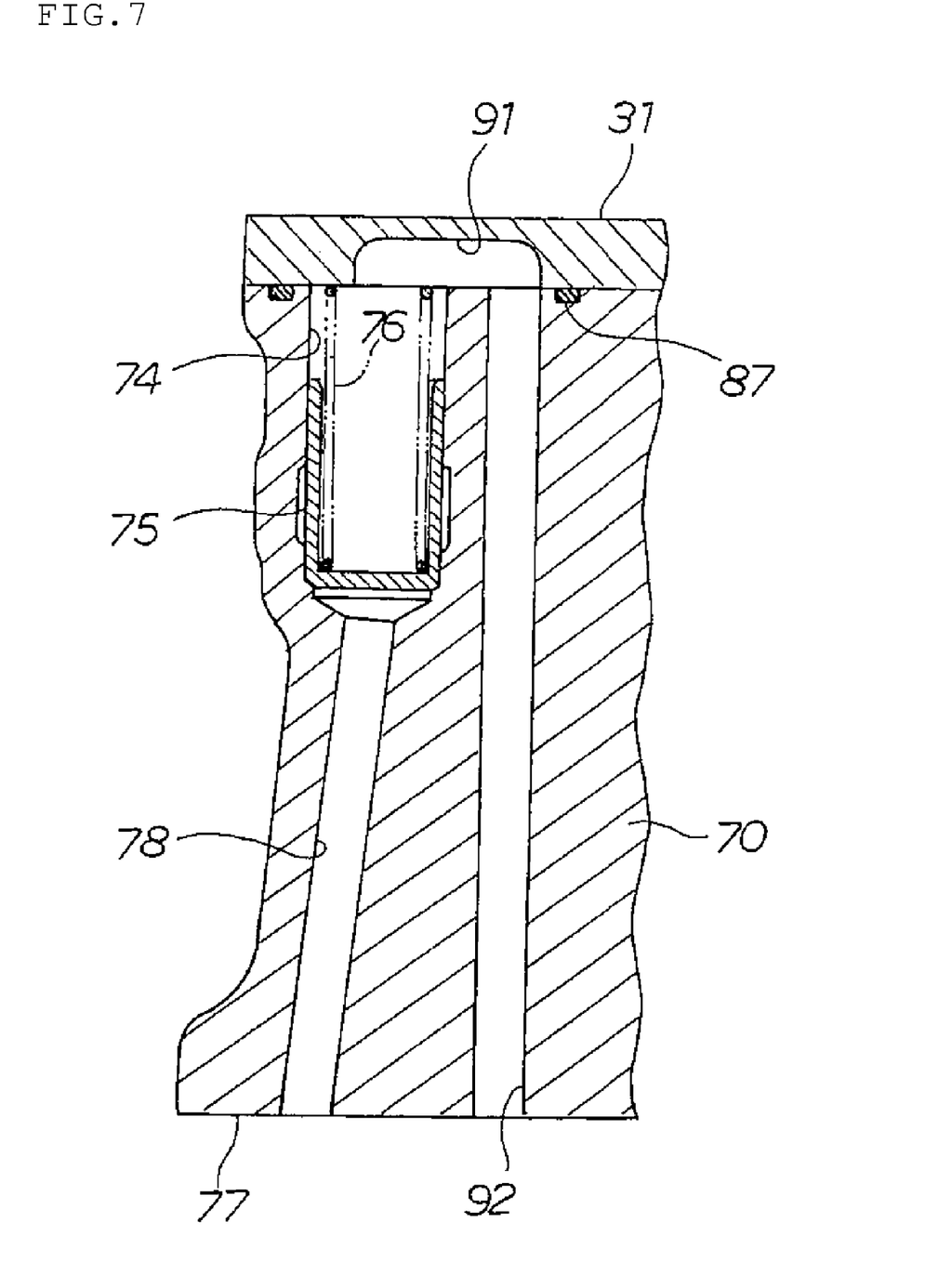
FIG. 7 is a cross-sectional view taken along the line 7-7 of FIG. 6.

FIG. 7 is a cross-sectional view taken along the line 7-7 of FIG. 6. A groove 91 is formed in the flange portion 31 so as to allow the fluid to escape from the upper side of the retaining-valve installation chamber 74. A communication passage 92 is formed in the plunger body 70 so as to extend from an end of the groove 92 and to reach the seat face 77. Note that, since the retaining-valve body 75 is only fitted in the retaining-valve installation chamber 74, a slight amount of oil may leak from the oil supply passage 78 to the retaining spring 76 side. When the leak oil is discharged via the groove 91 and the communication passage 92, the retaining-valve body 75 can move smoothly.

Moreover, since air inside the retaining-valve installation chamber 74 is not compressed, the retaining-valve body 75 moves more smoothly.

The operation of the tensioner for an endless transmission belt with the above-described configuration will be described below.

Figure 8:
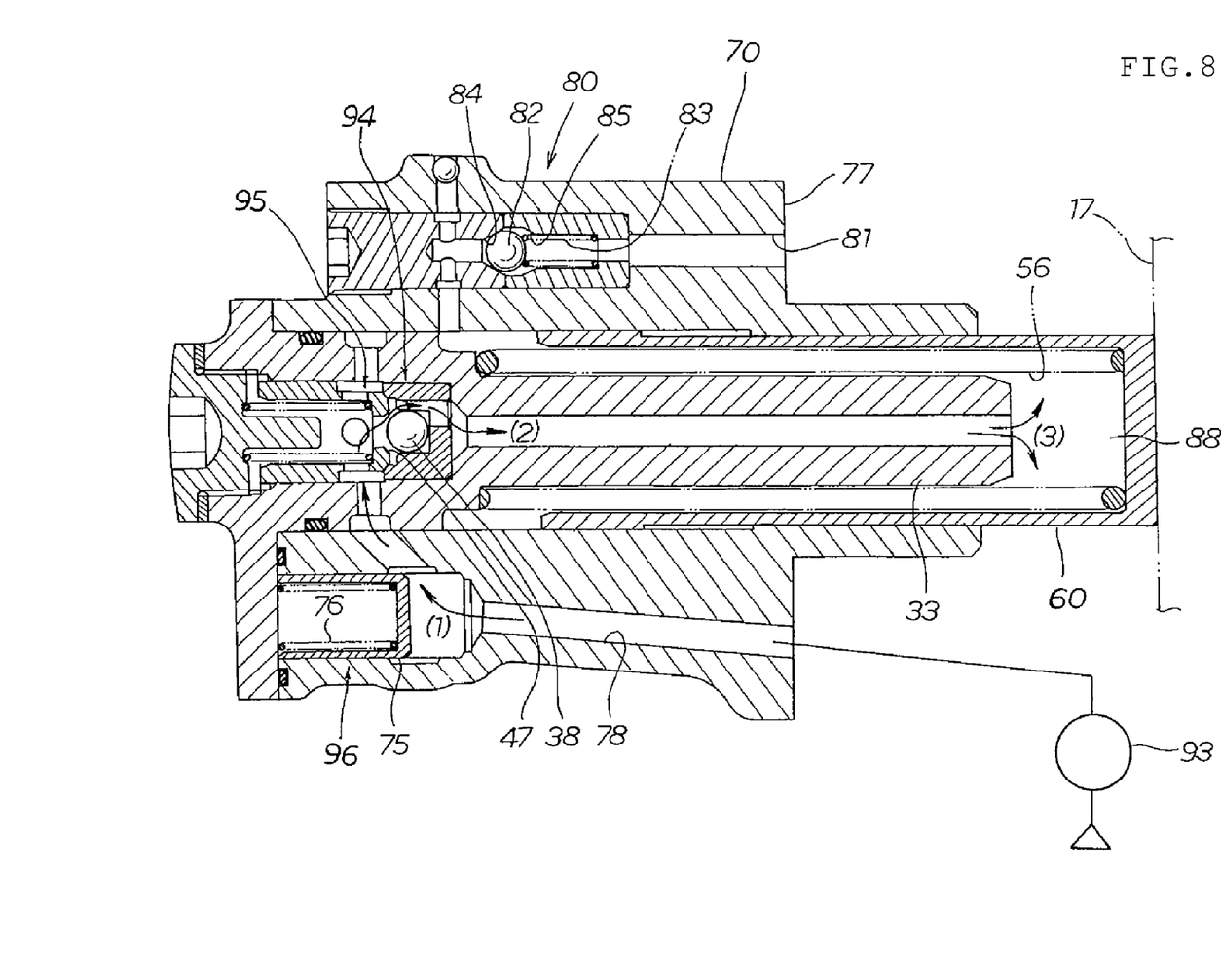
FIG. 8 is a diagram for describing the operation of the tensioner for an endless transmission belt.

FIG. 8 is a diagram for describing the operation of the tensioner for an endless transmission belt. Reference numeral 94 denotes a check valve, 95 denotes a relief valve, and 96 denotes a pressure retaining valve. The detail of these valves 94, 95, and 96 will be described later. The check valve 94 and the relief valve 95 are placed within the width (within the outer diameter) of the plunger 60. The placement of the relief valve 95 within the width of the plunger 60 allows the plunger body 70 to be made smaller in size in a direction that is orthogonal to the longitudinal direction of the relief valve 95. Accordingly, the tensioner can be made smaller in size.

In the configuration of the figure, once the oil pump 93 starts to operate, the oil pump 93 supplies the hydraulic oil of high pressure to the oil supply passage 78. Once the pressure of the hydraulic oil exceeds a certain level, the retaining-valve body 75 moves against the spring force of the retaining spring 76. Thus, the pressure retaining valve 96 is opened allowing the hydraulic oil to flow as indicated by the arrow (1) in the figure. The ball-shaped second valve body 38 is pushed by the hydraulic oil, and thus leaves the second valve seat portion 47. As a consequence, the hydraulic oil flows as indicated by the arrows (2) and (3), reaches the high-hydraulic-pressure chamber 88, and then is stored there.

Meanwhile, at the initial stage of the engine operation, air may remain in the high-hydraulic-pressure chamber 88. In this case, the air pushed by the hydraulic oil pushes the purge-valve body 82. Once the purge-valve body 82 moves rightward in the figure against the spring force of the purge spring 83, the air is discharged to the seat face 77 via the purge channel 81. When there remains no air, the purge-valve body 82 is pushed not by the air but directly by the hydraulic oil. The hydraulic oil, which has a much larger density than the air, pushes the purge-valve body 82 strongly. Accordingly, the purge-valve body 82 abuts on the second purge-valve seat 85. Thus, the purge channel 81 is closed. Henceforth, there is no possibility that the hydraulic oil leaks out to the seat face 77 side.

Moreover, there may be a case of a drastic decrease in the pressure of the high-hydraulic-pressure chamber 88. In this case, the purge-valve body 82 is biased by the purge spring 83 to reach the first valve seat 84. This eliminates the possibility that the air enters from the seat face 77 side to the high-hydraulic-pressure chamber 88.

In other words, the air purge valve 80 has an effect of preventing the outside air from entering inside and of discharging, selectively, the air to the seat face 77 side.

The plunger 60 advances forward until the combined force of the biasing force by the hydraulic oil and the biasing force of the plunger spring 56 equilibrates with the reaction force of the tensioner shoe 17 indicated by an imaginary line in the figure.

With an increase in the reaction force of the tensioner shoe 17, the plunger spring 56 is compressed, and the second valve body 38 moves leftward in the figure.

Figure 9A:
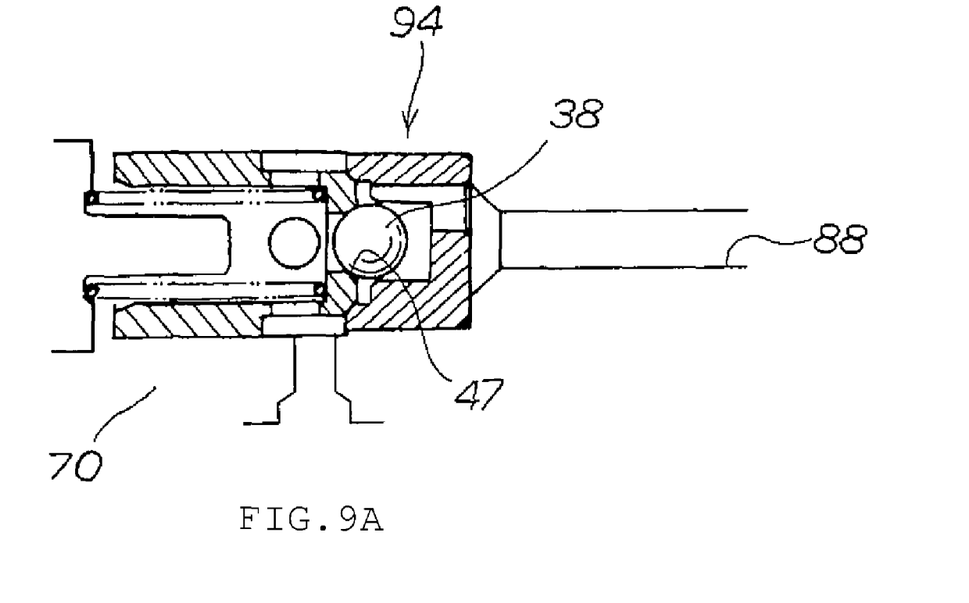
FIGS. 9A and 9B are diagrams illustrating respectively the operation of the check valve and the operation of the relief valve.
Figure 9B:
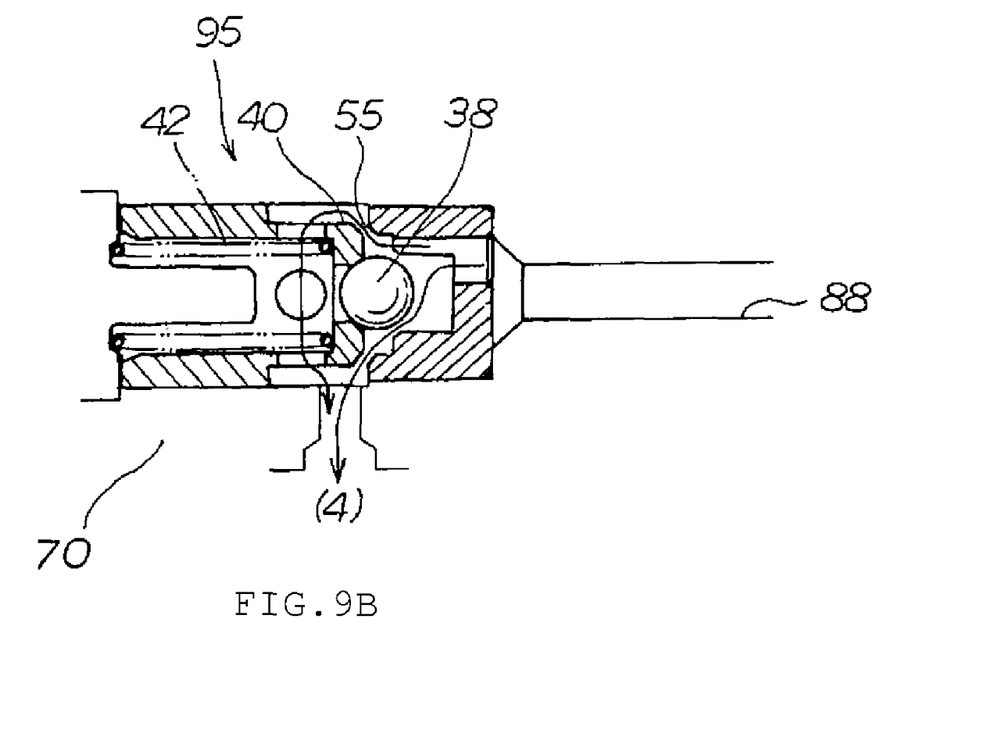

FIGS. 9A and 9B are diagrams illustrating the operation of the check valve 94 and the operation of the relief valve 95. As FIG. 9A shows, the movement of the hydraulic oil to the left-hand side in the drawing is blocked by the abutting of the second valve body 38 on the second valve-seat portion 47. The second valve-seat portion 47 and the second valve body 38 constitute the check valve 94 which prevents the backward flow.

In a case where the pressure of the high-hydraulic-pressure chamber 88 increases furthermore, as FIG. 9B shows, the first valve body 40 and the second valve body 38 together move to the left-hand side in the drawing against the spring force of the first spring 42. As a consequence, the first valve body 40 leaves the first valve-seat portion 55, and thus the hydraulic oil flows as indicated by the arrow (4). This hydraulic oil returns to the oil supply passage 78 shown in FIG. 8. Namely, the second valve body 38, the first valve body 40, the first valve-seat portion 55, and the first spring 42 combined together constitute the relief valve (pressure relief valve) 95.

In normal operation, the valves are in any one of the states shown in FIGS. 8, 9A, and 9B. What is characteristic here is, particularly in FIG. 9B, the fact that the hydraulic oil discharged for the purpose of relieving the pressure returns back to the oil supply passage 78. In the conventional technique, the hydraulic oil is discharged to the internal combustion engine such as a cam-chain chamber. In contrast to the conventional technique, there is no possibility that the hydraulic oil is discharged to the cam-chain chamber. Accordingly, the hydraulic oil can be used efficiently, so that the load on the oil pump 93 can be alleviated.

Subsequently, the operation in the case of a decrease in the pressure of the oil supply passage 78 will be described below.

In the configuration of FIG. 8, once the engine 10 is stopped, the oil pump 93 ceased to operate so that the pressure of the oil supply passage 78 is decreased. Then, as a result of the biasing effect of the retaining spring 76, the retaining-valve body 75 moves to the right-hand side in the figure. As a consequence, the retaining-valve body 75 closes the oil supply passage 78 as FIG. 5 shows, and the hydraulic oil in the high-hydraulic-pressure chamber 88 does not return back to the oil supply passage 78. Accordingly, the pressure of the high-hydraulic-pressure chamber 88 is maintained. In this manner, the retaining-valve installation chamber 74, the retaining-valve body 75, and the retaining spring 76 which are provided in the oil supply passage 78 constitute the pressure retaining valve 96.

If the pressure retaining valve 96 is provided, the pressure of the high-hydraulic-pressure chamber 88 is prevented from decreasing, which would otherwise take place immediately after the engine 10 is stopped.

Moreover, as FIG. 8 shows, the relief valve 95 and the check valve 94 are placed so as to be adjacent to each other in the axial direction of the installation hole 71 (71B in FIG. 4).

The back-side face of the relief valve 95 (the left-hand-side face in FIG. 8) receives the pressure applied by the hydraulic oil pumped out from the oil pump 93. Accordingly, the pressure that is needed to open the relief valve 95 varies in accordance with the revolutions of the engine 10. With this configuration, the tensioner 20 can apply, on the cam chain 15, a pressure corresponding to the revolutions of the engine 10. To be more specific, the pressure of the hydraulic oil from the oil pump 93 increases as the revolutions of the engine 10 increase. Therefore, lower revolutions of the engine 10 are accompanied by a lower pressure needed to open the relief valve 95, while higher revolutions of the engine 10 are accompanied by a higher pressure needed to open the relief valve 95 so that the relief valve 95 is not easily opened.

The high-hydraulic-pressure chamber 88 stores the hydraulic oil pumped out from the oil pump 93. In addition, the high-hydraulic-pressure chamber 88 also plays a role of making the plunger 60 more difficult to be pushed back by the cam chain 15 and a role of pushing the plunger 60 out to the cam chain 15 side.

Now, a summary based on the description having been made thus far will be given below.

In the embodiment of the present invention, as FIG. 8 shows, the check valve 94 and the relief valve 95 are formed between the high-hydraulic-pressure chamber 88 and the oil supply passage 78. In addition, the relief valve 95 allows the hydraulic oil in the high-hydraulic-pressure chamber 88 to escape to the oil supply passage 78. The oil supply passage 78 is connected to the oil pump 93. Even when the relief valve 95 is opened, the hydraulic oil returns back to the oil supply passage 78. Accordingly, an efficient use of the hydraulic oil is achieved. In addition, the load of the oil pump 93 can be reduced, and the oil pump 93 can be made smaller in size.

In the embodiment of the present invention, as FIG. 8 shows, the pressure retaining valve 96 is provided in the course of the oil supply passage 78 and between the oil pump 93 and the relief valve 95. The pressure retaining valve 96 is closed when the pressure of the hydraulic oil supplied from the oil pump 93 is lowered down to a second predetermined value so as to prevent the pressure of the high-hydraulic-pressure chamber 88 from being lowered down.

When the discharge pressure of the oil pump 93 is lowered down as the engine 10 stops, the pressure retaining valve 96 becomes in a closed state. The closing of the pressure retaining valve 96 prevents the pressure of the high-hydraulic-pressure chamber 88 from being lowered down, and helps the tensioner 20 to maintain its function. Accordingly, even when the phenomenon of a reverse rotation of the crankshaft 11 occurs at the time of stopping the engine 10, the timing chain can be maintained in an ordinary state. To put it differently, the timing chain is prevented from being in the opposite state. Here, in the opposite state, a side of the timing chain which side has been tight thus far becomes loose and another side which has been loose becomes tight. As a consequence, even when the engine 10 is started next time, there is no possibility that any noise is produced from the endless transmission belt, such as a cam chain. The engine 10 can achieve higher silence performance.

In the embodiment of the present invention, as FIG. 5 shows, the longitudinal direction of the retaining-valve installation chamber 74 is aligned to the longitudinal direction of the installation hole 71. To put it differently, the retaining-valve installation chamber 74 is formed in the plunger body 70 so that the axis (longitudinal axis) 73 of the retaining-valve installation chamber 74 is substantially parallel to the axis (longitudinal axis) 71B of the installation hole 71. For this reason, the retaining-valve installation chamber 74 and the installation hole 71 can be formed so as to be adjacent to each other. As a consequence, although the pressure retaining valve 96 is provided in the plunger body 70, the plunger body 70 can be made smaller in size.

In the embodiment of the present invention, as FIG. 6 shows, in the plunger body 70, the attachments 89 and 89 used when the tensioner 20 for an endless transmission belt are attached to the internal combustion engine 10 is formed at positions where the attachments 89 and 89 can surround the plunger 60 and at the same time the attachments 89 and 89 can avoid the pressure retaining valve 96 (retaining-valve installation chamber 74). The attachments 89 and 89 and the pressure retaining valve 96 (retaining-valve installation chamber 74) are placed at positions located around the plunger 60, so that the diameter of the plunger body 70 can be made smaller. As a consequence, the tensioner 20 for an endless transmission belt can be made smaller in size.

In the embodiment of the present invention, as FIG. 7 shows, the communication passage 92 that communicatively connects the retaining-valve installation chamber 74 to the inside of the internal combustion engine 10 is formed in the plunger body 70.

Discharging the fluid via the communication passage 92 to the inside of the internal combustion engine 10 allows the pressure retaining valve 96 (retaining-valve body 75) to operate even more favorably.

The embodiment of the present invention is suitable for a tensioner for an endless transmission belt provided as an adjunct in an internal combustion engine.

In an embodiment of the present invention, the check valve and the relief valve are formed between the high-hydraulic-pressure chamber and the oil supply passage. In addition, the relief valve allows the hydraulic oil in the high-hydraulic-pressure chamber to escape to the oil supply passage. The oil supply passage is connected to the oil pump. Even when the relief valve is opened, the hydraulic oil returns back to the oil supply passage. Accordingly, an efficient use of the hydraulic oil is achieved. In addition, the load of the oil pump can be reduced, and the oil pump can be made smaller in size.

In an embodiment of the present invention, the pressure retaining valve is provided in the course of the oil supply passage and between the oil pump and the relief valve. The pressure retaining valve is closed when the pressure of the hydraulic oil supplied from the oil pump is lowered down to the second predetermined value so as to prevent the pressure of the high-hydraulic-pressure chamber from being lowered down.

When the discharge pressure of the oil pump is lowered down as the engine stops, the pressure retaining valve becomes in a closed state. The closing of the pressure retaining valve prevents the pressure of the high-hydraulic-pressure chamber from being lowered down, and helps the tensioner to maintain its function. Accordingly, even when the phenomenon of a reverse rotation of the crankshaft occurs at the time of stopping the engine, the timing chain can be maintained in an ordinary state. To put it differently, the timing chain is prevented from being in the opposite state. Here, in the opposite state, a state in which a side of the timing chain which side has been tight thus far becomes loose and another side which has been loose becomes tight. As a consequence, even when the engine is started next time, there is no possibility that any noise is produced from the endless transmission belt, such as a cam chain. The engine can achieve higher silence performance.

In an embodiment of the present invention, the retaining-valve installation chamber is formed in the plunger body so that the axis of the retaining-valve installation chamber is substantially parallel to the axis of the installation hole. For this reason, the retaining-valve installation chamber and the installation hole can be formed so as to be adjacent to each other. As a consequence, although the pressure retaining valve is provided in the plunger body, the plunger body can be made smaller in size.

In an embodiment of the present invention, in the plunger body, the attachment used when the tensioner for an endless transmission belt is attached to the internal combustion engine is formed at a position where the attachment can surround the plunger and at the same time the attachment can avoid the pressure retaining valve. The attachment and the pressure retaining valve are placed at their positions located around the plunger, so that the diameter of the plunger body can be made smaller. As a consequence, the tensioner for an endless transmission belt can be made smaller in size.

In an embodiment of the present invention, the communication passage that communicatively connects the retaining-valve installation chamber to the inside of the internal combustion engine is formed in the plunger body.

Discharging the fluid via the communication passage to the inside of the internal combustion engine allows the pressure retaining valve to operate even more favorably.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by letters patent Of the united states is:

1. A tensioner for an endless transmission belt, comprising:
a plunger body in which an installation hole is provided;
a plunger movably provided in the installation hole to press the endless transmission belt;

a plunger spring disposed between the plunger and the plunger body to push the plunger toward the endless transmission belt;

a high-hydraulic-pressure chamber provided between the plunger and the plunger body and configured to store hydraulic oil supplied from an oil pump;

an oil supply passage provided in the plunger body to supply the hydraulic oil from the oil pump to the high-hydraulic-pressure chamber;

a check valve provided between the high-hydraulic-pressure chamber and the oil supply passage and configured to allow the hydraulic oil to be supplied from the oil pump to the high-hydraulic-pressure chamber, and wherein the check valve is configured to be closed when a pressure in the high-hydraulic-pressure chamber is higher than a pressure of the hydraulic oil supplied by the oil pump;

a relief valve provided between the high-hydraulic-pressure chamber and the oil supply passage and configured to discharge the hydraulic oil in the high-hydraulic-pressure chamber to the oil supply passage when the pressure in the high-hydraulic-pressure chamber exceeds a first predetermined value; and a pressure retaining valve provided in the oil supply passage between the oil pump and the relief valve.

2. The tensioner according to claim 1, wherein the pressure retaining valve is configured to be closed when the pressure of the hydraulic oil supplied by the oil pump is lower than a second predetermined value.

3. The tensioner according to claim 2, wherein the pressure retaining valve comprises a pressure retaining valve installation chamber having an axis and provided in the plunger body so that the axis of the pressure retaining valve installation chamber is substantially parallel to an axis of the installation hole, and a pressure retaining valve body movably provided in the pressure retaining valve installation chamber and configured to open and close the oil supply passage.

4. The tensioner according to claim 3, further comprising:

an attachment provided at the plunger body to surround the plunger and to avoid the pressure retaining valve, the tensioner is configured to be attached to an internal combustion engine via the attachment.

5. The tensioner according to claim 2, wherein the pressure retaining valve comprises a pressure retaining valve installation chamber provided in the plunger body, a pressure retaining valve body movably provided in the pressure retaining valve installation chamber and configured to open and close the oil supply passage, a pressure retaining spring provided in the pressure retaining valve installation chamber to press the pressure retaining valve body to close the pressure retaining valve, and a communication passage provided in the plunger body to connect the pressure retaining valve installation chamber and an inside of an internal combustion engine.

6. The tensioner according to claim 1, wherein the check valve and the relief valve directly abut one another.

7. An internal combustion engine comprising:

an endless transmission belt; and a tensioner configured to press the endless transmission belt and comprising:

a plunger body in which an installation hole is provided;

a plunger movably provided in the installation hole to press the endless transmission belt;

a plunger spring disposed between the plunger and the plunger body to push the plunger toward the endless transmission belt;

a high-hydraulic-pressure chamber provided between the plunger and the plunger body and configured to store hydraulic oil supplied from an oil pump;

an oil supply passage provided in the plunger body to supply the hydraulic oil from the oil pump to the high-hydraulic-pressure chamber;

a check valve provided between the high-hydraulic-pressure chamber and the oil supply passage and configured to allow the hydraulic oil to be supplied from the oil pump to the high-hydraulic-pressure chamber, and wherein the check valve is configured to be closed when a pressure in the high-hydraulic-pressure chamber is higher than a pressure of the hydraulic oil supplied by the oil pump;

a relief valve provided between the high-hydraulic-pressure chamber and the oil supply passage and configured to discharge the hydraulic oil in the high-hydraulic-pressure chamber to the oil supply passage when the pressure in the high-hydraulic-pressure chamber exceeds a first predetermined value; and a pressure retaining valve provided in the oil supply passage between the oil pump and the relief valve.

8. The internal combustion engine according to claim 7, wherein the pressure retaining valve is configured to be closed when the pressure of the hydraulic oil supplied by the oil pump is lower than a second predetermined value.

9. The internal combustion engine according to claim 8, wherein the pressure retaining valve comprises a pressure retaining valve installation chamber having an axis and provided in the plunger body so that the axis of the pressure retaining valve installation chamber is substantially parallel to an axis of the installation hole, and a pressure retaining valve body movably provided in the pressure retaining valve installation chamber and configured to open and close the oil supply passage.

10. The internal combustion engine according to claim 9, further comprising:

an attachment provided at the plunger body to surround the plunger and to avoid the pressure retaining valve.

11. The internal combustion engine according to claim 8, wherein the pressure retaining valve comprises a pressure retaining valve installation chamber provided in the plunger body, a pressure retaining valve body movably provided in the pressure retaining valve installation chamber and configured to open and close the oil supply passage, a pressure retaining spring provided in the pressure retaining valve installation chamber to press the pressure retaining valve body to close the pressure retaining valve, and a communication passage provided in the plunger body to connect the pressure retaining valve installation chamber and an inside of the internal combustion engine.

12. The internal combustion engine according to claim 7, wherein the check valve and the relief valve directly abut one another.

\* \* \* \* \*